(12) United States Patent
Meissner et al.

(10) Patent No.: US 9,109,724 B2
(45) Date of Patent: Aug. 18, 2015

(54) DEVICE FOR FIXING A FITTING

(75) Inventors: Kai-Michael Meissner, Kreuztal (DE); Andreas Hutte, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 0 days.

(21) Appl. No.: 13/585,012

(22) Filed: Aug. 14, 2012

(65) Prior Publication Data
US 2013/0207379 A1    Aug. 15, 2013

(30) Foreign Application Priority Data
Aug. 24, 2011 (DE) .......................... 10 2011 111 055

(51) Int. Cl.
| | |
|---|---|
| F16L 3/00 | (2006.01) |
| F16L 3/10 | (2006.01) |
| A62C 35/68 | (2006.01) |
| F16L 3/11 | (2006.01) |

(52) U.S. Cl.
CPC ............... *F16L 3/1091* (2013.01); *A62C 35/68* (2013.01); *F16L 3/11* (2013.01)

(58) Field of Classification Search
USPC .............. 285/64, 61, 124.5, 45; 248/57, 68.1, 248/212, 69, 85, 72; 52/34, 35; 137/884
See application file for complete search history.

(56) References Cited

U.S. PATENT DOCUMENTS

| | | | | |
|---|---|---|---|---|
| 347,084 | A * | 8/1886 | Blackmore et al. | 285/45 |
| 1,470,485 | A * | 10/1923 | Gus | 285/45 |
| 2,863,677 | A * | 12/1958 | Hauch et al. | 285/45 |
| 4,153,279 | A * | 5/1979 | Blue | 285/62 |
| 4,320,882 | A * | 3/1982 | Bachle | 248/72 |
| 4,688,829 | A * | 8/1987 | Shioda et al. | 285/61 |
| 5,460,204 | A * | 10/1995 | Rossi | 137/884 |
| 5,839,703 | A * | 11/1998 | Tesar | 248/65 |
| 6,039,360 | A * | 3/2000 | Ohmi et al. | 285/61 |
| 6,874,538 | B2 * | 4/2005 | Bennett | 137/884 |
| 7,036,528 | B2 * | 5/2006 | Eidsmore et al. | 137/884 |
| 7,172,221 | B1 * | 2/2007 | Ferrara | 285/61 |
| 7,404,417 | B2 * | 7/2008 | Eidsmore | 137/884 |
| 7,426,937 | B2 * | 9/2008 | Doverspike | 285/64 |
| 7,458,389 | B2 * | 12/2008 | Doverspike | 285/64 |
| 7,458,397 | B2 * | 12/2008 | Doyle | 137/884 |
| 7,562,677 | B2 * | 7/2009 | Perusek et al. | 137/884 |
| 7,686,041 | B2 * | 3/2010 | Eidsmore et al. | 137/884 |
| 7,784,497 | B2 * | 8/2010 | Eriksson | 137/884 |
| 7,886,770 | B2 * | 2/2011 | Eriksson | 137/884 |
| 7,950,619 | B2 * | 5/2011 | Takeda et al. | 285/61 |
| 8,235,067 | B2 * | 8/2012 | Gagne et al. | 137/884 |
| 2002/0162903 | A1 * | 11/2002 | Kirk | 239/288.5 |
| 2004/0112446 | A1 * | 6/2004 | Eidsmore et al. | 137/884 |
| 2006/0012164 | A1 * | 1/2006 | Douglas et al. | 285/45 |
| 2006/0192067 | A1 * | 8/2006 | Oh | 248/342 |
| 2012/0061106 | A1 | 3/2012 | McAllister et al. | |

FOREIGN PATENT DOCUMENTS

| | | |
|---|---|---|
| DE | 10214682 C1 | 8/2003 |
| DE | 202009012710 U1 | 3/2011 |
| WO | 2010128971 A1 | 11/2010 |

* cited by examiner

*Primary Examiner* — David E Bochna
(74) *Attorney, Agent, or Firm* — The Webb Law Firm

(57) ABSTRACT

A device for fixing a fitting, in particular for a sprinkler head, includes a base plate which can be used in various installation situations. According to one configuration, the technical problem of providing a fixing device is solved by the base plate having at least three mountings and by a top piece being present which covers the mountings. The fixing device can thereby be attached to a supporting base in different positions. In addition, a fixing device can accommodate different fittings.

12 Claims, 5 Drawing Sheets

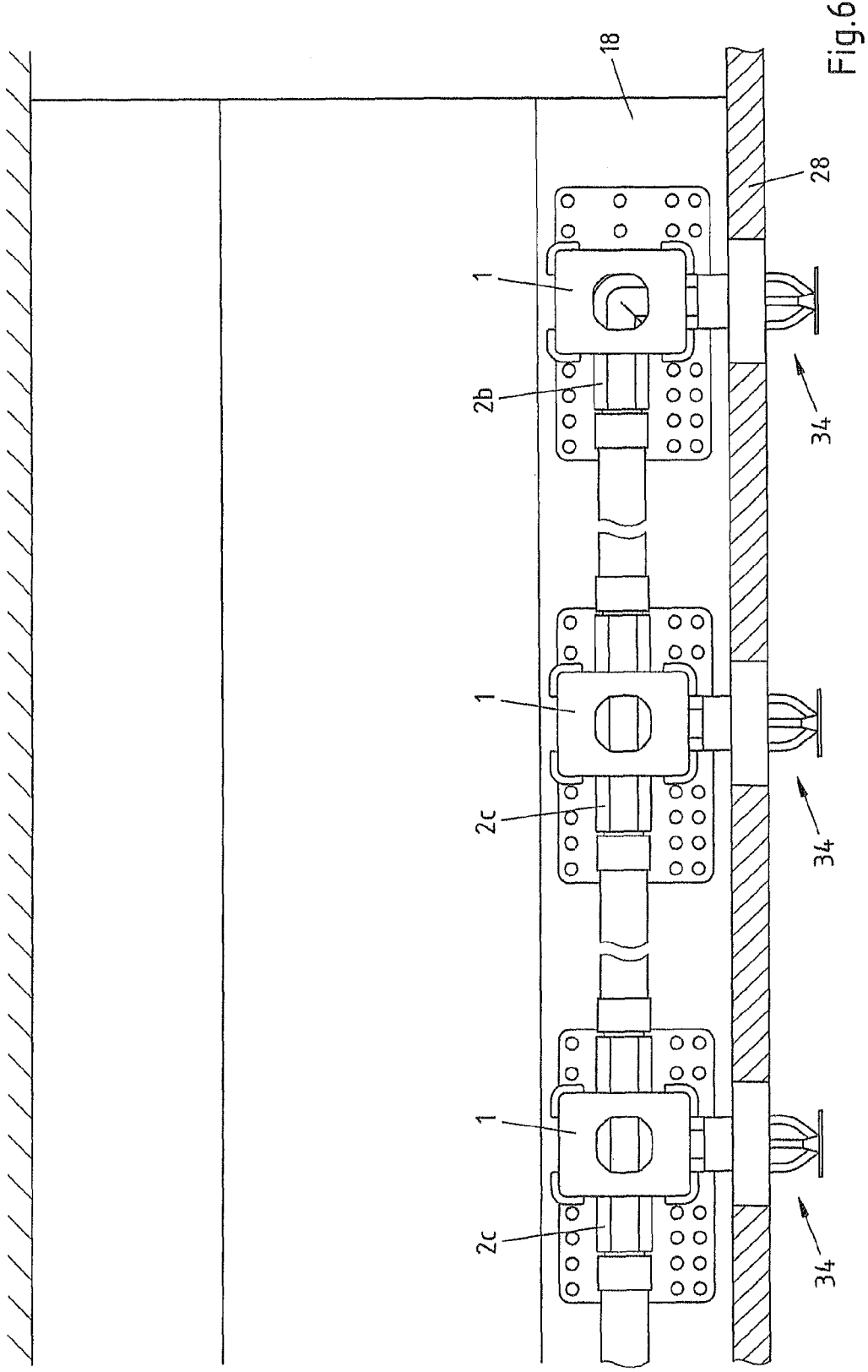

DEVICE FOR FIXING A FITTING

BACKGROUND OF THE INVENTION

1. Field of the Invention

The invention relates to a device for fixing a fitting, in particular for a sprinkler head, having a base plate.

2. Description of the Related Art.

Sprinkler heads are located on the ceilings of, for example, private households, business premises or industrial facilities. They are usually installed above the ceiling in the room, so that the sprinkler head projects into the room. Devices for fixing sprinkler heads to a supporting base, also called fixing devices below, are known from the prior art. A plurality of sprinkler heads are connected to one another via piping with fittings to form a sprinkler system.

Individual fixing devices are often adapted to the respective fitting. The disadvantage of this is that when sprinkler heads with different fittings are being installed the appropriate fixing device always has to be available, which means that a large stock of different types of fixing devices has to be kept. WO 10128971 A1 discloses a fixing device which has a fixing plate and a mounting plate, wherein the mounting plate is perpendicularly connected to the fixing plate via a seamed edge. The fixing plate has two hole pairs for fixing the device to a supporting base. The mounting plate comprises three semi-circular mountings for accommodating a fitting. The fitting is put onto the mountings.

The disadvantage with this fixing device is that by putting the fitting onto the mounting the fixing device can only attached to the supporting base in one particular position. Due to the fact that the fixing plate only has two hole pairs, the device cannot be attached to any supporting base and, in particular, it cannot be attached to a supporting base which is narrower than the distance between the hole pairs.

SUMMARY OF THE INVENTION

Taking this prior art as the starting point, the invention is based on the problem of providing a fixing device which can be used in various installation situations and which avoids the disadvantages of the prior art.

According to the invention, the object is achieved by a fixing device having the features of the characterising part of Claim 1. For this purpose, the fixing device has a base plate having at least three mountings and a top piece, wherein the top piece covers the mountings. If the base plate is connected to the top piece, the fixing device serves to accommodate a fitting. In this state, the top piece covers the mountings, in particular in the direction of the base plate. Due to the fact that the base plate and the top piece are separate from one another and owing to the at least three mountings, the fixing device can be used in various installation situations. Various positions of attachment to a supporting base and the accommodation of various fittings are counted among this. Consequently, it is no longer necessary to have in stock a matching fixing device for each fitting.

In one particularly preferred embodiment, the top piece has at least three recesses.

In a preferred way, the mountings of the base plate and the top piece possibly with the recesses form a profile for a twist proof accommodation of the fitting. The profile can, for example, have an at least two-fold rotational symmetry. Owing to the twist safety, the fitting sits particularly stable and secure in the fixing device. The presence of at least three recesses in the top piece can ensure better stability in accommodating the fitting by means of a higher twist safety.

In one embodiment, at least two of the mountings face one another in parallel, so that at least one straight fitting can be accommodated. In one particularly preferred embodiment, the base plate has four mountings which are situated in pairs at right angles to one another. This embodiment provides a particularly high degree of variability for accommodating different fittings in various installation situations. When the base plate is assembled, fittings of different designs can be fixed in various positions.

In another embodiment of the invention, at least two of the recesses of the top piece face one another in parallel, so that at least one straight fitting can be accommodated by the fixing device. In one particularly preferred embodiment, the top piece has four mountings which are situated in pairs at right angles to one another. This embodiment, in particular in combination with four mountings which are situated in pairs at right angles to one another, provides a particularly high degree of variability for accommodating different fittings in various installation situations. When the base plate is assembled, fittings of different designs can be fixed in various positions.

The top piece preferably has an opening. This opening can be characterised by a perpendicular bisector which is orthogonal to the surface area of the opening. In a preferred way, the perpendicular bisector of the opening is substantially orthogonal to the perpendicular bisector of the mountings. As a result of this, variability with regard to using various fittings is further increased. If the fixing device has four mountings and possibly four recesses together with a top piece opening, the device can then accommodate a fitting which at a maximum is formed in three directions (x-, y- and z-).

In another preferred embodiment, the base plate has a plurality of holes for fixing to a supporting base. The plurality of holes enables the base plate to be fixed to various supporting bases. In particular, the base plate can be fixed to narrow supporting bases, for example to the sides of an I-beam.

In one embodiment, the connection between the base plate and the top piece is a releasable connection, in particular a connection using detents and corresponding snap-in openings. Alternatively, the connection can also comprise a screw connection, a hook-and-loop fastener, a tongue and groove joint or other releasable connections.

The invention furthermore relates to a fitting, in particular for a sprinkler head, having a base body, which has an outer profile, and having at least two pipe attachments, wherein the outer profile is designed for a twist-proof accommodation in a fixing device, for example of the type previously mentioned. The outer profile can, for example, have an at least two-fold rotational symmetry.

In a preferred way, fittings with different inner diameters have the same outer profiles. This has the advantage that fittings with different inner diameters are suitable for accommodating in a single fixing device.

The fitting can be formed in different ways and thereby fulfill different functions. The fitting can comprise a straight pipe section to provide a straight connection. For a change in direction, the fitting can comprise a pipe bend. For branching, the fitting can comprise a T-piece connector.

In addition, the invention relates to a system consisting of a fixing device and a fitting, in particular for a sprinkler head, wherein the fixing device has a base plate and a top piece, wherein the base plate has at least three mountings, wherein the top piece covers the mountings, wherein in each case a mounting and the top piece possibly with the recesses form an inner profile, wherein the fitting comprises a base body, which has an outer profile, and at least two pipe attachments, and wherein the outer profile of the base body is suitable for accommodating in the inner profile of the fixing device.

In a preferred way, the outer profile of the fitting is at least in sections in contact with the mountings of the base plate and/or the top piece or the recesses of the top piece and/or the opening of the top piece. A stable and twist-proof connection is hereby ensured between the fixing device and the fitting.

In a particularly preferred way, the fitting can be formed in different ways combined with the fixing device, so that the system consisting of the fixing device and the fitting can fulfill different functions. The fitting can comprise a straight pipe section to provide a straight connection. To provide a change in direction, the fitting can comprise a pipe bend. For branching, the fitting can comprise a T-piece connector. Different installation situations can be produced by the different forms of the fittings combined with the fixing device.

By using a plurality of fixing devices, in which the fittings comprise T-piece connectors, a plurality of sprinkler heads can be attached in series. By subsequently using a fixing device, in which the fitting comprises a straight pipe section or a pipe bend, a termination of sprinkler heads attached in series, for example, can be brought about.

BRIEF DESCRIPTION OF THE DRAWINGS

The invention is explained in more detail below by means of exemplary embodiments, in which reference is made to the attached drawings:

FIG. 5 shows an arrangement in series of two exemplary embodiments of two systems according to the invention in the installed state and FIG. 6 shows an arrangement in series of three exemplary embodiments of three systems according to the invention in the installed state.

DETAILED DESCRIPTION OF THE INVENTION

Figure 1:
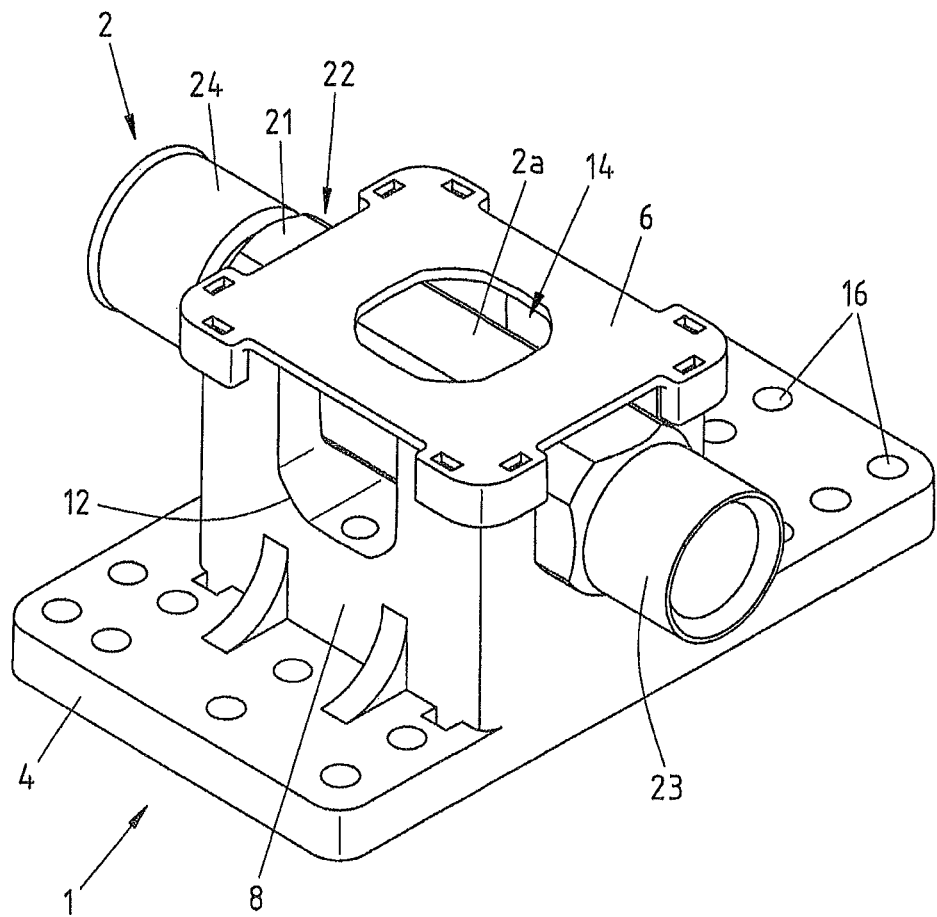
FIG. 1 shows an exemplary embodiment of a system according to the invention.
Figure 2:
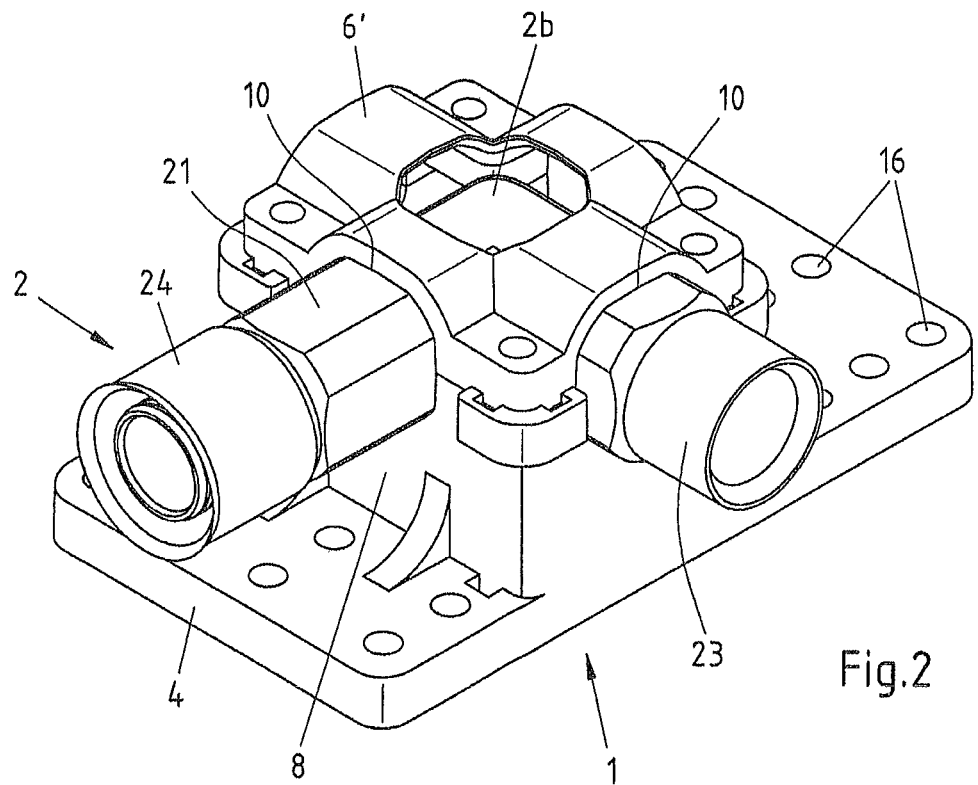
FIG. 2 shows another exemplary embodiment of a system according to the invention.
Figure 3:
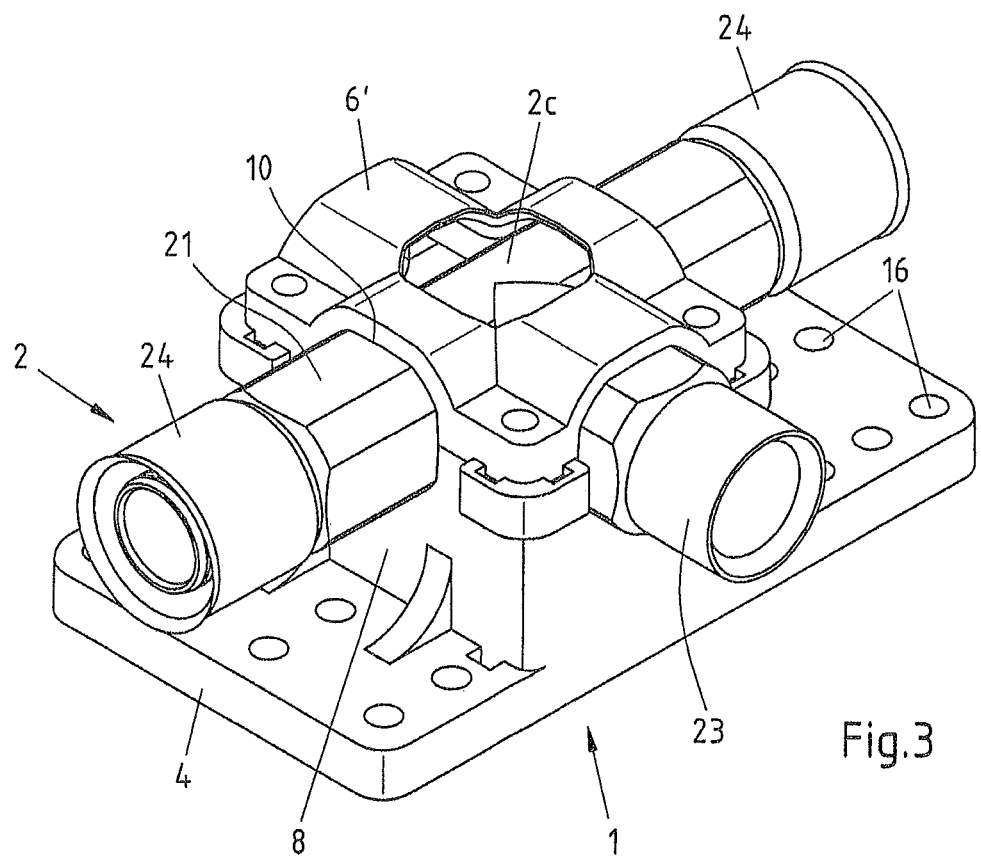
FIG. 3 shows another exemplary embodiment of a system according to the invention.

In FIGS. 1 to 3, in each case an exemplary embodiment of a system according to the invention, consisting of an exemplary embodiment of a fixing device according to the invention and an exemplary embodiment of a fitting according to the invention, is illustrated, in which the same reference symbols denote the same elements.

The fixing device 1 according to the invention comprises a base plate 4 and a top piece 6, 6'. FIGS. 1 to 3 show the base plate 4 and the top piece 6, 6' when connected. In the exemplary embodiments illustrated, the base plate 4 has four mountings 8 which are firmly connected to the base plate 4. These mountings 8 can consist of four elements, but, alternatively, they can also be made from one block. In the exemplary embodiment illustrated in FIG. 1, the top piece 6 corresponds to a plate without recesses, but, alternatively, the top piece 6 can also have at least three recesses. In the exemplary embodiments in FIGS. 2 and 3, the top piece 6' in each case has 4 recesses. Alternatively, however, the top piece 6' can also have fewer, more or no recesses. When connected, in each case, a mounting 8 and the top piece 6, 6' or a recess 10 of the top piece 6' form a profile 12 for accommodating a fitting 2 in a way which is twist-proof. FIGS. 1 to 3 in each case comprise a profile with a four-fold rotational symmetry. The exemplary embodiments in FIGS. 1 to 3 additionally show an opening 14 of the top piece 6, 6', wherein the perpendicular bisector of the opening 14 is orthogonal to the perpendicular bisectors of the mountings 8. The base plate 4 has a plurality of holes 16 for attaching the fixing device 1 to a supporting base.

The fitting 2 according to the invention has a base body 22 having an outer profile 21 and at least two pipe attachments 23 and 24. The outer profile 21 is designed to be accommodated in a way which is twist-proof in, for example, the above mentioned fixing device 1 according to the invention. The illustrated embodiments of the fittings 2 have a profile which has a four-fold rotational symmetry.

FIGS. 1 to 3 show a fitting 2 and a fixing device 1 when connected. The said figures additionally in each case show different embodiments of the fitting 2 according to the invention. In FIG. 1, the fitting 2 comprises a straight pipe section 2a. In FIG. 2, the fitting consists of a pipe bend 2b and in FIG. 3 the fitting comprises a T-piece connector 2c. In the exemplary embodiments in FIGS. 1 and 2, the fittings 2 each have an attachment 24 for a further pipe connection and an attachment 23 for a sprinkler head. The fitting 2 illustrated in FIG. 3 has two attachments 24 for further pipe connections and an attachment 23 for a sprinkler head.

Figure 4:
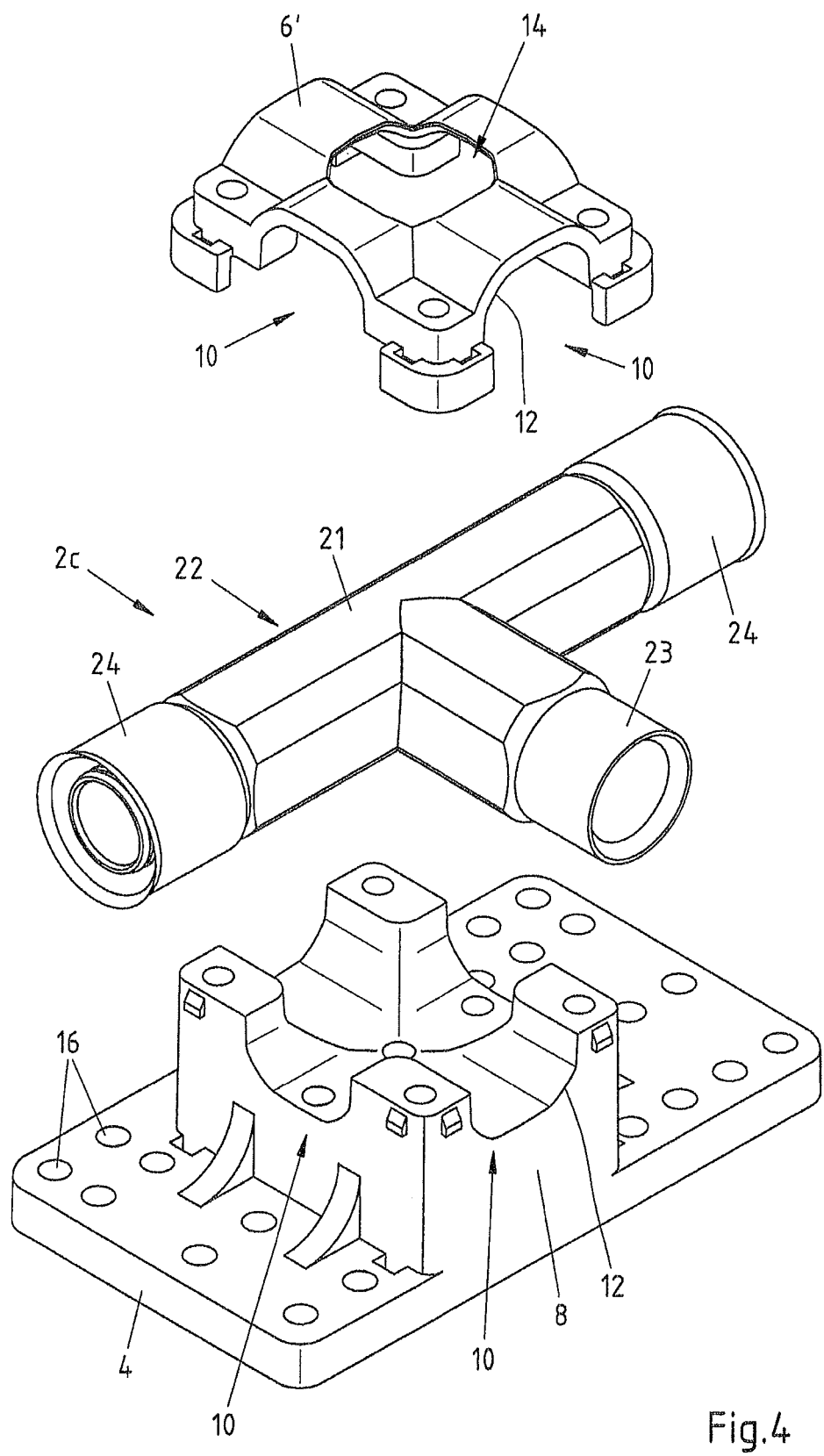
FIG. 4 shows another exemplary embodiment of a system according to the invention in an exploded view.

FIG. 4 shows an exemplary embodiment of a system according to the invention consisting of an exemplary embodiment of a fixing device 1 according to the invention and an exemplary embodiment of a fitting 2 according to the invention in an exploded view, in which the same reference symbols denote the same elements as in FIGS. 1 to 3. The fitting 2 comprises, corresponding to FIG. 3, a T-piece connector 2c. The illustration shows that for assembly the fitting 2 is initially put onto the mountings 8.

Then, by assembling the top piece 6, 6', the fitting 2 is firmly connected to the fixing device 1. This combination enables, for example, the fitting 2 and the fixing device 1 to be completely pre-assembled, which makes the installation of, for example, a sprinkler head considerably easier.

Figure 5:
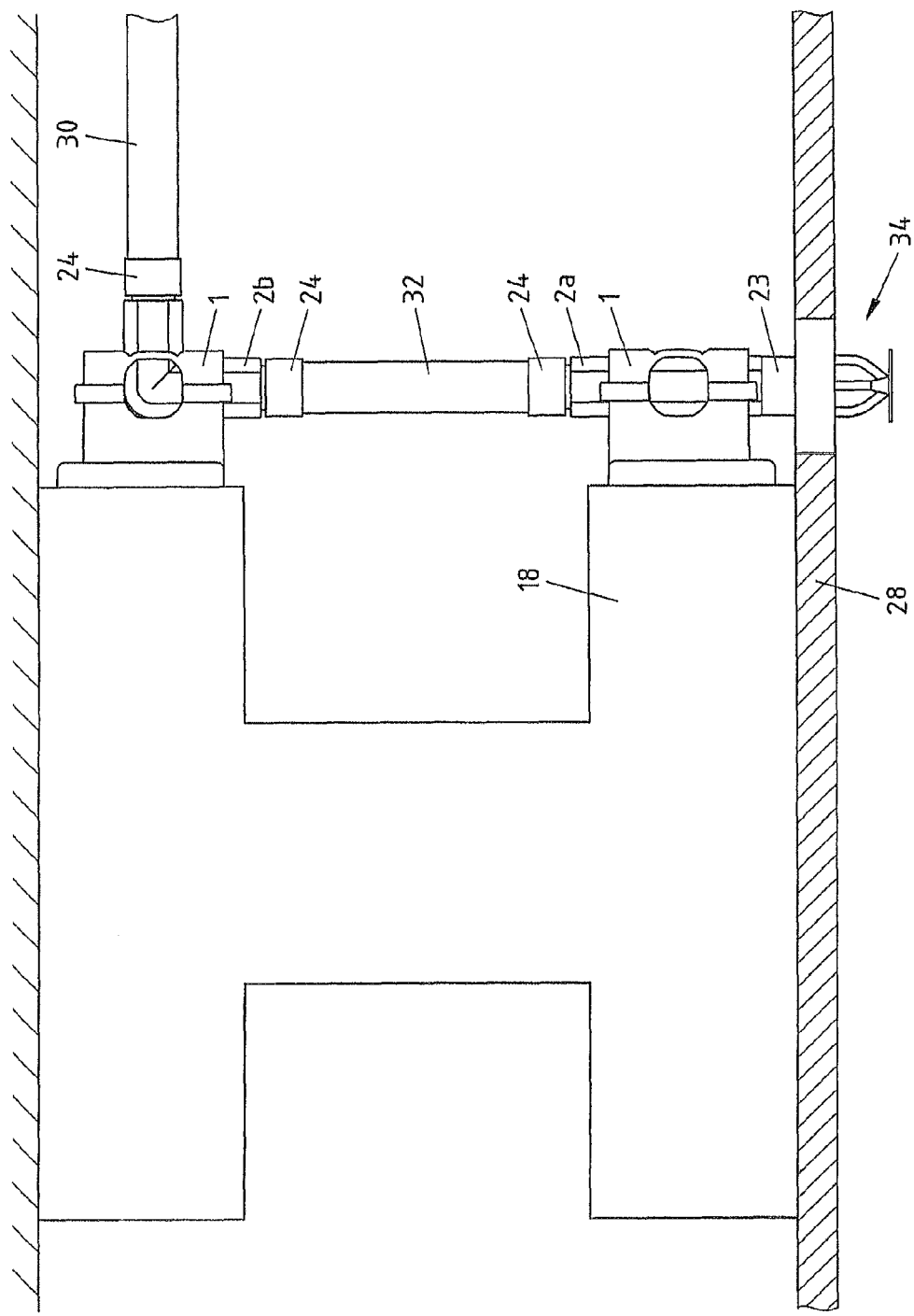

FIG. 5 shows an arrangement in series of two exemplary embodiments of two systems according to the invention, in the installed state, in which the same reference symbols denote the same elements as in FIGS. 1 to 4. One possible way to assemble the fixing device 1 is to attach the system according to the invention to the sides of an I-beam 18 which is located above the room ceiling 28. In FIG. 5, the system, by way of example, is installed perpendicular to the room ceiling 28. The system can equally be attached in the direction of the room ceiling 28. The embodiments of the systems according to the invention in FIG. 5 differ from one another in terms of the embodiments of the fittings 2 according to the invention. The upper system comprises a fitting in the form of a pipe bend 2c. This system serves, by way of example, as an adapter piece for the change of direction between two pipes 30 and 32. The lower system comprises a fitting 2 in the form of a straight pipe section 2a. This system serves, by way of example, as an attachment for a sprinkler head 34 which is attached to the room ceiling 18.

FIG. 6 shows an arrangement in series of three exemplary embodiments of three systems according to the invention, in the installed state, in which the same reference symbols denote the same elements as in FIGS. 1 to 5. As an alternative to the possible way illustrated in FIG. 5 of installing the fixing devices 1, the attachment in series shown in FIG. 6 is, for example, to the longitudinal side of an I-beam 18. The embodiments of the illustrated systems differ from one another in terms of the embodiments of the fittings 2 according to the invention. Two of the three systems illustrated comprise fittings 2 in the form of T-piece connectors 2c. By attaching this embodiment of fixing devices 1 in series, a plurality of sprinkler heads 34, for example, can be connected in series to one another. The third fixing device comprises a fitting 2 in the form of a pipe bend 2b. This system can be used for attaching a terminating sprinkler head 34.

The invention claimed is:

1. A device for fixing a fitting for a sprinkler head, the device comprising,
 a base plate, wherein
 the base plate has at least three mountings, each mounting having a first recess, wherein
 a top piece is provided for covering the mountings, wherein the top piece has at least three second recesses,
 wherein each of the first recesses and the second recesses together form at least three non-circular profile openings for a twist-proof accommodation of the fitting, and
 wherein the mountings extend in a substantially perpendicular orientation from the base plate to allow mounting on a flat surface, wherein the base plate has a plurality of holes for fixing to a support base.

2. The device according to claim 1, wherein at least two of the mountings face one another in parallel.

3. The device according to claim 1, wherein four mountings are provided, and in that the mountings are situated in pairs at right angles to one another.

4. The device according to claim 1, wherein at least two of the second recesses of the top piece face one another in parallel.

5. The device according to claim 1, wherein four mountings and four second recesses are provided, and wherein two pairs of the second recesses of the top piece are in each case situated at right angles to one another.

6. The device according to claim 1, wherein the top piece has an opening, the perpendicular bisector of which is substantially perpendicular to the perpendicular bisectors of the mountings.

7. The device according to claim 1, wherein the connection between the base plate and the top piece is a releasable connection.

8. A fitting for a sprinkler head, the fitting comprising
 a base body, which has an outer profile, and
 at least two pipe attachments,
 wherein the outer profile is designed for a twist-proof accommodation in a fixing device according to claim 1.

9. The fitting according to claim 8, wherein
 the fitting comprises a straight pipe section for a straight connection,
 a pipe bend for a change in direction, or
 a T-piece connector for branching.

10. A system comprising a fixing device and a fitting for a sprinkler head,
 wherein the fixing device has a base plate and a top piece,
 wherein the base plate has at least three mountings, each mounting having a first recess,
 wherein the mountings extend away in a substantially perpendicular orientation from the base plate to allow mounting on a flat surface,
 wherein the top piece has at least three second recesses,
 wherein the top piece covers the mountings,
 wherein each of the first recesses and the second recesses together form at least three non-circular profile openings for a twist-proof accommodation of the fitting,
 wherein the fitting comprises a base body, which has an outer profile, and at least two pipe attachments, and
 wherein the outer profile of the base body is suitable for accommodating in the inner profile of the fixing device.

11. The system according to claim 10, wherein the outer profile of the fitting is at least in sections in contact with the mountings of the base plate or with the top piece or with an opening of the top piece.

12. The system according to claim 10, wherein
 the fitting comprises a straight pipe section for a straight connection,
 a pipe bend for a change in direction, or
 a T-piece connector for branching.

\* \* \* \* \*